United States Patent [19]

Laughlin et al.

[11] Patent Number: 5,619,263

[45] Date of Patent: Apr. 8, 1997

[54] BOX HANGER AND METHOD

[75] Inventors: Raymond S. Laughlin, Cuyahoga Falls; Robert Smigel, North Royalton; Richard Lees, Stow, all of Ohio

[73] Assignee: Erico International Corporation, Solon, Ohio

[21] Appl. No.: 407,765

[22] Filed: Mar. 21, 1995

[51] Int. Cl.⁶ .................................................. B42F 13/00
[52] U.S. Cl. .................... 248/343; 248/229.16; 248/906
[58] Field of Search .................................. 248/906, 342, 248/343, 344, 229.16, 229.26, 231.81, 300, 205.1; 174/58; 220/3.9, 3.92

[56] References Cited

U.S. PATENT DOCUMENTS

| | | | |
|---|---|---|---|
| 2,316,389 | 4/1943 | Atkinson | 248/300 |
| 2,930,564 | 3/1960 | Maier | 248/906 X |
| 2,963,253 | 12/1960 | Maier et al. | 248/906 X |
| 3,273,845 | 9/1966 | Jepsen | 248/222.13 X |
| 3,804,359 | 4/1974 | Cumber | 248/205.1 |
| 3,987,992 | 10/1976 | Foflygen | 248/906 X |
| 4,050,603 | 9/1977 | Harris et al. | 220/3.9 |
| 5,209,444 | 5/1993 | Rinderer | 248/906 X |
| 5,330,137 | 7/1994 | Oliva | 248/906 X |
| 5,386,959 | 2/1995 | Laughlin et al. | 248/906 X |

OTHER PUBLICATIONS

Literature—Advanced Designs & Development, "T–Bridge Support Bracket".
Literature—Erico, CADDY "Acoustical Tee Bar Electrical Box Hanger", 512A Height Adjustable Fixture Hanger, p. 26, circa.
Literature—Arc–Co Incorporated, "Metal Stud Box Hangers Assembly".
Literature—Arc–Co Incorporated, "Drop Ceiling Bar Electrical Box Hanger, Cat. No. DCB 512", p. 16.

Primary Examiner—Ramon O. Ramirez
Attorney, Agent, or Firm—Renner, Otto, Boisselle, Sklar

[57] ABSTRACT

The box support system uses a channel shape one piece slotted strut and a twist spring snap clip. The strut ends are bent opposite the legs of the channel to form spring separable fingers which snap over and lock behind the bulb on the stem of a Tee bar. The slots of the strut are centered transversely providing two equal shelves on each side. The slots are positioned asymmetrically longitudinally so that a box may be supported anywhere between spaced Tee bars. If it will not fit because of unslotted areas, it will fit if the strut test is turned end-for-end. The spring snap clip includes a V-shape body forming a pointed nose. The two legs of the body have shouldered necked portions adjacent outwardly extending feet which terminate in upwardly extending toe tab. Opposite shoulders at the neck include oppositely angled spring locking talons. Box assembly is obtained by inserting the clip through the center knockout in the back of a box with the toe tabs entering two smaller holes on each side of the knockout. Then using the box as a handle for the clip the clip is inserted into the slot and the clip-box assembly is twisted 90°. The talons rake over the shelves on each side of the slot limiting the twisting to one direction until the toe tabs projecting slightly through the box back wall snap into the slot.

74 Claims, 3 Drawing Sheets

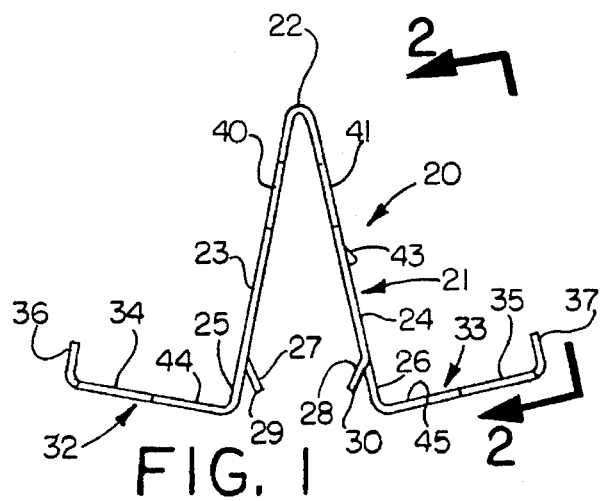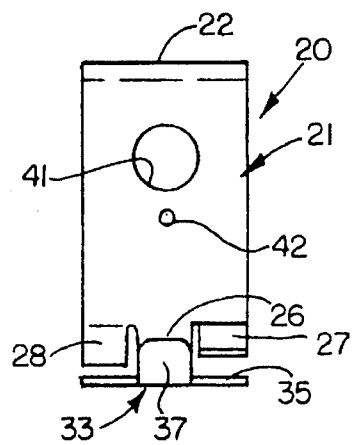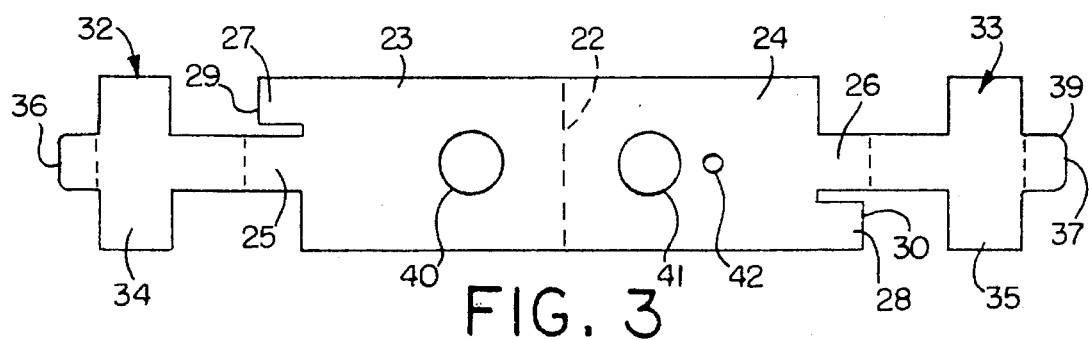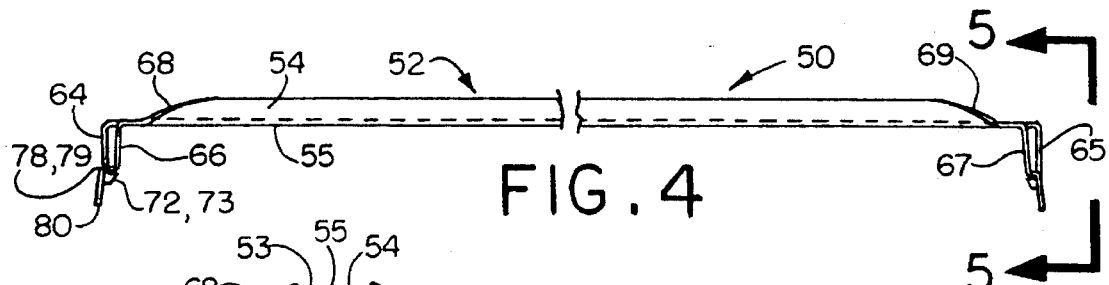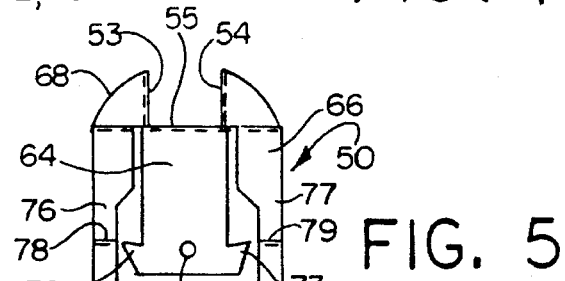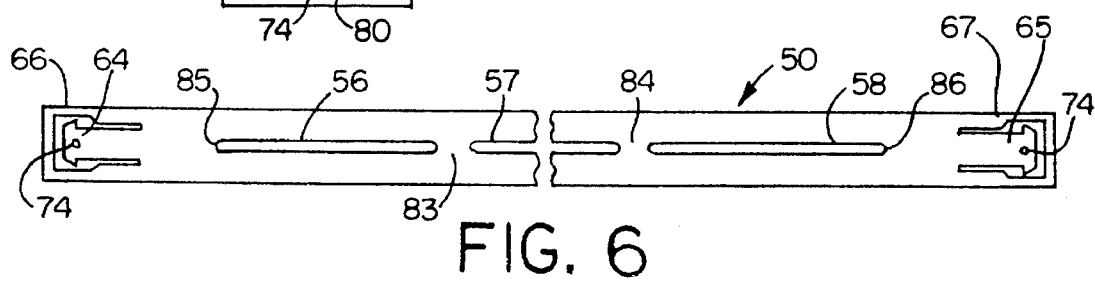

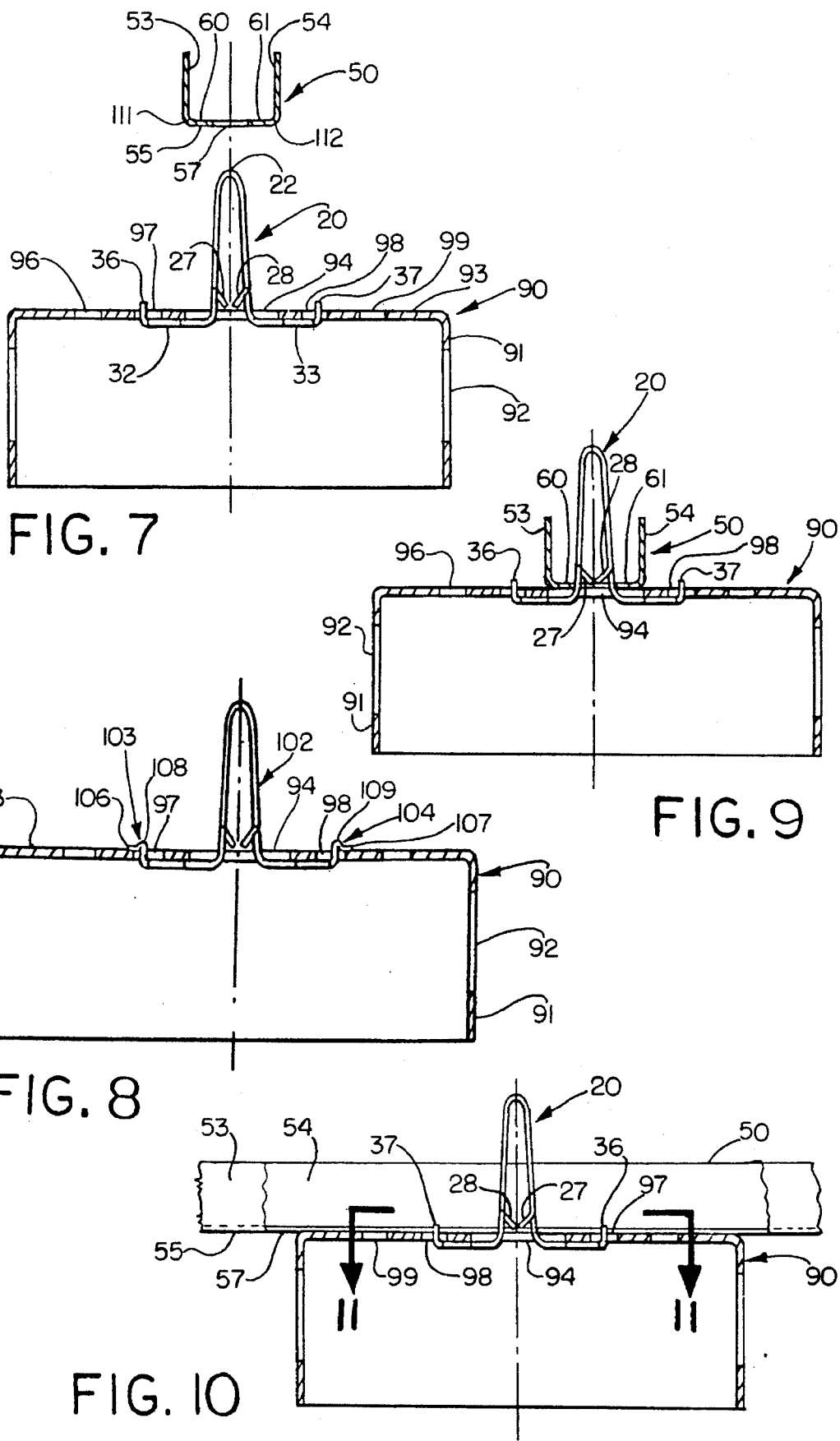

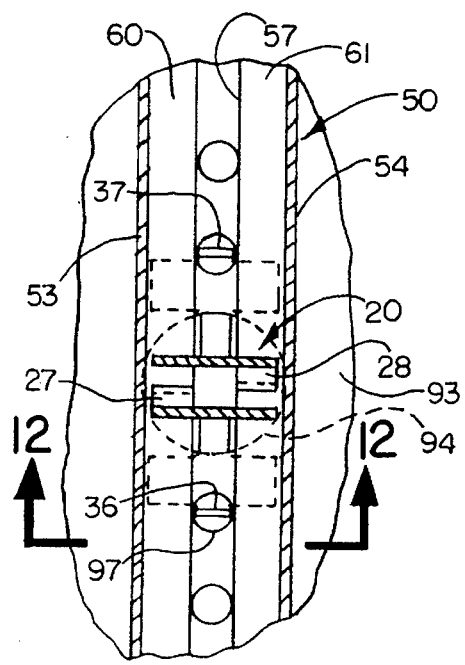
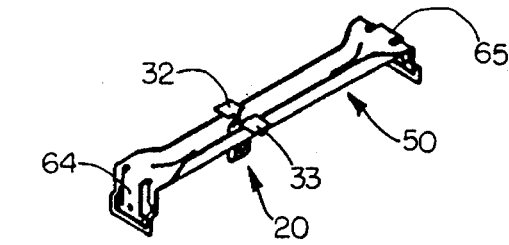
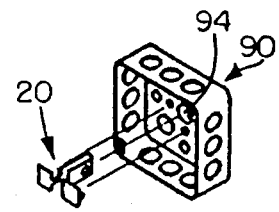
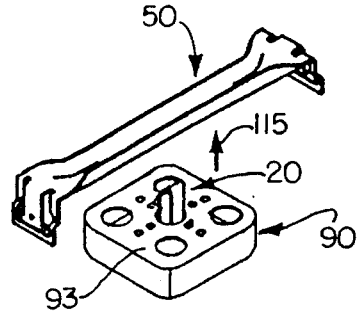
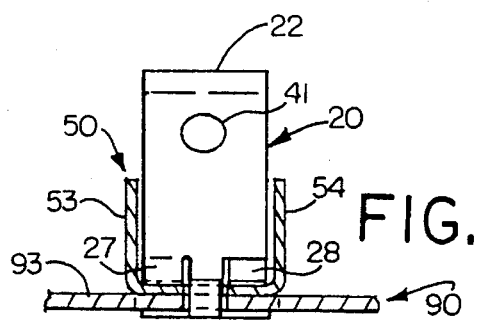
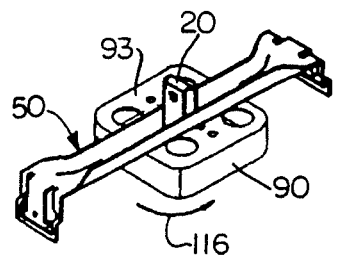
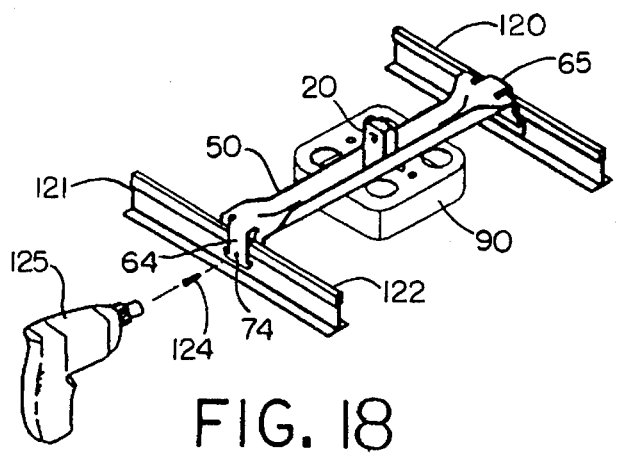
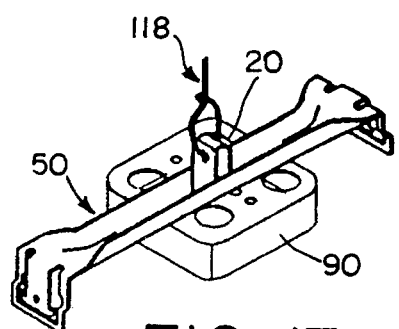

BOX HANGER AND METHOD

DISCLOSURE

This invention relates generally as indicated to a box hanger, and more particularly to a strut, clip, and method for securing an electrical box between two Tee bars or the like and normally without the use of screw fasteners.

BACKGROUND OF THE INVENTION

Acoustical "Tee Bar" electrical box hangers have been widely employed, in the construction of ceilings, and particularly suspended or drop ceilings. A widely used example is the CADDY® 512 or 512A box hanger. CADDY® is a registered trademark of Erico, Inc. of Solon, Ohio. The hanger comprises two clips riveted to the ends of a spanning bar which snap on the bulb end of the stem of the Tee. The box is held to the spanning bar by a spring finger clip embracing the bar which is secured to the back of the box by a threaded fastener. The spanning bar is rectangular and edgewise to the load, with the spring finger including a bent portion extending over the back edge of the bar and clasping the box to the front or lower edge. The 512A hanger includes slotted intermediate brackets between the ends of the spanning bar and Tee bar clips. The spanning bar is secured to the brackets by threaded clamp fasteners.

Another similar box hanger is the ARC-CO drop ceiling bar which utilizes swivel brackets at each end of the spanning bar which are clamped to the Tee bar with a threaded fastener. The box is held to the bar by what is known as a swivel hickey which again uses a threaded fastener manipulated through a relatively large clamp from inside the box.

Other types of systems are employed but commonly use threaded fasteners such as nuts and bolts, cap screws, or sheet metal screws, to hold the box to the bar. To the installer, screws and other detached pieces of a multipart assembly can become a nightmare. The work is usually done on a ladder or scaffold and lost parts or forgotten special tools can be a real time wasting problem which can induce the installer into jury rigged unsafe shortcuts. Moreover, all buildings vibrate, and suspended wire or chain drop ceilings are susceptible to special harmonics. The vibrations may be imperceptible such as those from fan motors, or be more perceptible such as those caused by wind or earthquakes. Accordingly, any fastening system should not only be easy to install, but should also provide a firm yet somewhat yielding connection, and also not be or able to become loose. It would thus be desirable to achieve such a connection with a spring clip and screwless quick mount strut and clip assembly, having all of the flexibility and advantages of the more complex multipart screw fastener type hangers described above. It would also be desirable if the clip could be preassembled with the strut for shipping purposes, and the clip preassembled with the box for ease of installation, the box then acting as a handle for installation of the clip and box on the strut. In this manner, the clip box and strut should be capable of assembly without any tools, even pliers.

SUMMARY OF THE INVENTION

The present invention utilizes a box support strut which is a one piece slotted strut. The ends are bent downwardly to form spring separable finger sections which snap over and lock behind the bulb on the stem of a Tee bar. The finger sections are formed by interconnected outside spring fingers which include shoulders to seat beneath the inside of the bulb of the Tee. The fingers also include a center finger section having sharp tangs adapted to bite into the Tee bar stem on the outside but again beneath the bulb. The major extent of the box support is a channel-form with a series of slots extending along the back of the channel. While the slots are centered transversely, providing two generally flat substantially equal slot spaced shelves on each lateral side of the slot, the slots are asymmetrical end-to-end. The slots are dimensioned in length and positioned longitudinally so that a box may be supported anywhere between the spaced Tee bars. If the box will not fit because it is blocked by unslotted areas of the strut or an end of the slot too far from a Tee bar, it will fit in the desired position if the box hanger strut is turned end-for-end.

The spring snap clip includes a body bent into a relatively sharp V to form a pointed nose. The two sides or legs of the body are straight but terminate away from the V-point in a necked or more narrow portion. The shoulders at the neck include angled biting spring locking tabs or talons which extend inwardly in opposite directions. The neck portions just beyond the tips of the spring locking talons are bent away from each other at right angles to the sides of the body to form feet. The neck portions widen out to the width of the body and the feet terminate in short narrow rebent toe tab flanges which extend parallel to the body sides or legs. In another form, the toe tabs may terminate in short outwardly extending flanges parallel to the feet with a hump being formed at the proximal end of the short flange.

The body of the spring clip is designed to fit through the center knockout in the back wall of a box and the two short narrow toe tabs extend or key through the two much smaller holes found symmetrically on each side of the center knockout, but only after the body or legs of the clip have been squeezed together to reduce the angle of the V. This also brings the neck portions together so that the inscribed diameter at the neck just below the angled spring locking tabs or talons will turn in the slot of the box hanger strut. The tips of the talons are angled to permit turning in one direction only, with such tip edges biting into the generally flat shelves on each side of the slot. Turning may continue until the toe tabs of one form or the humps of the other form extending through the smaller holes of the back of the box snap into the slot of the strut. The spring snap clip and strut are preassembled for shipping and one leg of the clip is provided with a retaining dimple for this purpose.

Installation is obtained by removing the snap clip from the box support strut by squeezing from both ends of the clip to clear the dimple from the slot and lifting at the same time. Next, the installer inserts the snap clip into an electrical box through the center knockout, placing the locking rebent toe tab flanges in the small symmetrical adjacent holes. Next, the installer positions the electrical box and snap clip as assembled on the box strut at the desired location, pushing the V-point of the clip to enter and seat in the slot, and then rotating the electrical box and clip to lock the box into place. The angled locking talons on the clip engage and bite into the shelves on each side of the slot.

The strut and box can be disassembled since the end rebent toe tabs only project slightly into the slots of the strut. By slightly distorting the system, the box can be removed by continued rotation once the rebent toe tabs or the hump are clear of the strut slot.

In each instance of assembly and turning, the box acts as a handle for the snap clip making the clip much easier to turn with the oppositely angled spring talons on each side of the neck engaging and biting into the back of the slot at the shelves firmly yet resiliently holding the box and hanger bar strut together.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

BRIEF DESCRIPTION OF THE DRAWINGS

FIG. 1 is an edge elevation of one form of snap clip after forming;

FIG. 2 is an elevation of the clip taken from the line 2—2 of FIG. 1;

FIG. 3 is a plan of the blank of the clip before forming;

FIG. 4 is a side elevation on a reduced scale of the hanger strut;

FIG. 5 is an enlarged end elevation of the strut;

FIG. 6 is a plan view of the blank of the strut on the same scale as FIG. 4;

FIG. 7 is an enlarged transverse sectional exploded view of the strut, box and snap clip with the clip assembled to and projecting from the back of the box;

FIG. 8 is a similar view without the strut but showing another form of clip assembled with the box;

FIG. 9 is a view like FIG. 7 showing the clip inserted in the slot of the strut;

FIG. 10 is a view like FIG. 9 but taken longitudinally of the strut and also showing the box and clip rotated 90° with respect to the strut to lock the box to the strut;

FIG. 11 is a horizontal fragmentary section taken through the neck of the clip from the line 11—11 of FIG. 10;

FIG. 12 is a fragmentary section taken from the line 12—12 of FIG. 11;

FIG. 13 is a perspective view on a reduced scale of the strut and clip as assembled for shipment;

FIG. 14 is a similar view showing the clip removed and being assembled with the back of the box;

FIG. 15 is a similar perspective view showing the box and snap clip assembled and the assembly being assembled with the strut;

FIG. 16 is a similar view showing the 90° rotation of the clip and box assembly using the box as a handle for the clip;

FIG. 17 is a similar view illustrating a drop wire secured to the clip; and

FIG. 18 is a similar view indicating that in some circumstances a fastener may be employed to secure the strut to the stem of a Tee.

DETAILED DESCRIPTION OF THE PREFERRED EMBODIMENTS

Referring initially to FIGS. 1, 2 and 3, there is illustrated a spring snap clip shown generally at 20 which includes a body 21 bent into a relatively sharp V to form a pointed nose 22 dividing two equal sides or legs 23 and 24. Away from the nose, the legs terminate in more narrow neck portions 25 and 26. Opposite shoulders at the neck are provided with angled spring tabs or talons seen at 27 and 28, respectively. The angle between the legs may be approximately 25° in the formed condition seen in FIG. 1, and the angle of the talons 27 and 28, with respect to the plan, may be approximately 25°–30°. In any event, the talons point toward each other on opposite sides of the respective necks 25 and 26.

At a carefully controlled distance beyond the tips 29 and 30 of the respective talons, the legs are bent outwardly at right angles to form feet 32 and 33. The bend to form the feet is a right angle bend at the bottom of what is termed the neck of each leg, and it will be seen that the feet widen out to the width of the leg as seen at 34 and 35. The tip of each foot is provided with respective upturned toe tabs seen at 36 and 37, which in the formed condition of the clip as seen in FIG. 1, extend normal to the feet and parallel to the legs. The toe tabs are provided with radiused outer corners indicated at 39.

Each leg is provided with a circular hole as seen at 40 and 41 spaced symmetrically from the nose 22 for a purpose hereinafter described. Also, the leg 24 is provided with a relatively small dimple 42 which provides a short ramp 43 seen more clearly in FIG. 1. The shoulder provided by the ramped dimple may be used to retain the clip in the strut as hereinafter described for shipment purposes. In the manufacture of the strut, it is important to maintain the gauge between the tips 29 and 30 of the talons 27 and 28, and the tops 44 and 45 of the feet 32 and 33, since it is that dimension which enables the talons to function as hereinafter described.

Referring now to FIGS. 4, 5, 6 and 7, there is illustrated a strut 50 designed for use with the clip 20, and vice versa. The strut 50, or at least the slotted channel section thereof, is also shown in FIGS. 9, 10, 11 and 12, as well as the schematics of FIGS. 13, and 15–18.

The strut 50 is approximately 2 feet (60.96 cm) in length which is a standard spacing of Tee bars in a suspended ceiling. The major extent of the strut 50 is a slotted channel shaped body shown generally at 52 which includes upturned channel legs 53 and 54 separated by a channel bottom 55. It is the channel bottom 55 which is provided with slots seen at 56, 57 and 58 in FIG. 6. The slots are each aligned, and in the transverse center of the bottom. The slots form on each side of the bottom relatively short narrow shelves 60 and 61 seen, for example, in FIGS. 7 and 9.

The ends of the strut are formed into Tee bar stem gripping fingers which are adapted to grip the stem of the Tee bar on opposite sides of an enlarged or bulb head. Each end includes a central downwardly bent finger seen at 64 and 65, and also a downwardly bent U-shaped surrounding finger seen at 66 and 67. The Tee bar gripping fingers extend downwardly while the legs of the channel extend upwardly, such legs changing their position 90° at each end of the strut as seen by the curved edges 68 and 69. The central fingers 64 and 65 include inwardly angled edge barbs 72 and 73, adapted to bite into the far side of the stem of a Tee below the enlarged head of the Tee. The central fingers are also provided with a central screw hole seen at 74 for an optional purpose hereinafter described.

Each outer U-shape finger 66 includes legs 76 and 77 which are bent to form a sharp horizontal shoulder as seen at 78 and 79, respectively, which is approximately aligned with the tips of the barb 72 and 73. The legs 76 and 77 are connected at 80 beyond the center gripping finger. It is noted that in the unstressed condition of the legs, seen in FIG. 4, the U-shape leg at the bottom is on opposite sides of the barbs 72 and 73. By deflecting or separating the legs, the legs will readily snap over an enlarged stem of a Tee bar with the offset lower portion of the U-shape leg abutting firmly against the web of the Tee below the bulb, while the barbs 72 and 73 bite into the far side of the stem of the Tee, also below the bulb or enlargement.

Referring now to FIG. 6, it will be seen that the slots 56, 57 and 58 form transverse bridges indicated at 83 and 84, which are used to join the two sides of the major channel shape slotted extent of the strut for rigidity purposes. Such bridges may lie at the exact spot the installer wishes to support a box. For this reason, the length of the slots vary so that the bridges are asymmetrical end-to-end of the strut, and the slot ends indicated at 85 and 86 are also asymmetrical lengthwise of the strut. In this manner, the slots are dimensioned in length and positioned longitudinally so that the box may be supported anywhere between the spaced Tee bars. If the box will not fit because it is blocked by unslotted areas or bridges of the strut or an end of the slot too far from a Tee bar, it will fit in the desired position if the box hanger strut is turned end-for-end.

Referring now to FIG. 7, it will be seen that the clip 20 has been assembled with an electrical box shown generally at 90. Typically, the electrical box 90 includes side wall 91 which may include knockouts or punchouts 92. Typically, there may be three punchouts in each of the four wall faces. The box also includes a back wall 93 which includes a number of punchouts, but invariably a center punchout indicated at 94. A typical box might have five punchouts in the back wall 93 with four punchouts being arranged symmetrically around the center punchout 94. A standard box also has in the back wall smaller holes such as those indicated at 96, 97, 98 and 99, arranged symmetrically on each side of the center punchout 94. Such other small holes are normally used to receive fasteners for mounting the boxes on screw gun brackets which may extend from stud to stud in a wall, or for other mounting purposes. Reference may be had Delmore et al. U.S. Pat. No. 4,757,967, or Laughlin et al. U.S. Pat. No. 5,386,959 for examples of such box support brackets.

In FIG. 7, the clip 20 has been assembled to the box 90 by compressing the legs thereof and inserting the body of the clip through the large central punchout 94, and the toe tabs seen at 36 and 37 through the smaller symmetrically positioned holes 97 and 98. The clip has been inserted to the full extent permitted by the feet 32 and 33 which engage the interior of the box rear wall 93. It is noted that in the assembled position of FIG. 7, there is still a slight clearance between the tips of the talons 27 and 28, and the outer surface of the rear wall 93. It is also noted that the toe tabs 36 and 37 project a short distance, yet significantly beyond the exterior of the back wall of the box. In the position of FIG. 7, the body of the clip has been compressed so that the body is now much narrower than it is in the unstressed condition of FIG. 1, and there is significant spring pressure tending to separate the legs. The spring pressure maintains the clip assembled to the box and narrows the body of the clip for insertion into the slot 57.

In FIG. 8, there is illustrated a slightly modified clip in accordance with the present invention. The clip, shown generally at 102, is the same as the clip 20 except for slightly modified toe tabs indicated at 103 and 104. Such toe tabs terminate in relatively short outwardly extending flanges 106 and 107 with the proximal end of such flanges being provided with small humps indicated at 108 and 109. The humps project beyond the back wall 93 of the box 90 approximately the same extent as the toe tabs 36 and 37, and serve the same slot interlocking purpose hereinafter described. The relatively short flanges 106 and 107 which are parallel to the feet move behind the back wall of the box when the spring pressure of the clip 102 is released. In either embodiment, the clip is readily assembled to the box by pressing the legs together and inserting the nose through the center punchout opening until the feet are seated against the interior of the back wall of the box. In such condition, the toe tabs project through the small symmetrical holes on each side of the center punchout and release of the spring pressure secures the clip to the box with the nose projecting rearwardly from the center punchout.

It is noted as seen in FIG. 7 and 8, in the assembled condition of the box and clip, there is still a slight clearance between the tips 29 and 30 of the talons 27 and 28 in the back of the back wall 93 of the box 90. That clearance is slightly less than the gauge thickness of the strut which is the gauge thickness of the shelves 60 and 61 on each side of the slots.

Referring now to FIGS. 9, 10, 11 and 12, it will be seen that once the clip is assembled to the box to project through the back center punchout, the clip-box combination is then assembled to the strut 50 by pushing the nose 22 through the slot 57, for example, while using the box as a handle for the clip. When the box and clip have been seated against the underside of the strut as seen in FIG. 9, the box and clip are now rotated 90° to the position seen in FIGS. 10, 11 and 12. Because of the offset angled talons 27 and 28, the box and clip can be rotated in one direction only. The angled rake of the talons about the axis of the clip permits the clip and box to be rotated with respect to the strut in a clockwise direction only as seen from the bottom of FIG. 9. The talon 28 sweeps over the shelf 61 while the talon 27 sweeps over the shelf 60, and the radiused toe tabs 36 and 37, cam beneath the strut to snap into the slot 57 as seen in FIGS. 10, 11 and 12.

It is noted that there is a radius at the external corners of the channel of the strut seen more clearly at 111 and 112 in FIG. 7, and such radii in cooperation with the radii 39 on the toe tabs, permits the tips of the toe tabs to cam over the bottom of the channel and snap into the slot 57. Once in the position as seen in FIGS. 10, 11 and 12, the box and strut are firmly locked together without the aid of any screw fasteners.

Although difficult, the box can be removed by slightly distorting the system and again using the box as a handle to rotate the clip in the same direction. This enables the toe tabs to be forced out of the channel and continued rotation in such direction will return the clip and box to the position, seen in FIG. 9, only 180° out of phase. The clip and box can then be removed from the slot to be reinserted at some other location. The manipulation and turning of the clip is made much easier by utilizing the box as a handle, and accordingly, no pliers or special tools are required. The box provides a significant moment arm which makes the forceful twisting of the clip much easier than it would be otherwise.

Referring now to FIGS. 13–16, there is illustrated the strut, clip and box. It will be appreciated that the strut 50 is shown somewhat foreshortened for ease of illustration. For shipping purposes, the clip 20 is assembled to the strut 50 by inserting the nose through a channel slot with the feet of the clip engaging the channel edges. The ramped dimple 43 on the side of one leg of the clip will retain the clip assembled with the strut as illustrated in FIG. 13. The clip 20 is removed from the strut 50 simply by squeezing the legs of the clip from both ends of the feet and lifting the clip out of the strut.

As seen in FIG. 2, with the center knockout 94 open in the back wall 93 of the box 90, the clip 20 is inserted nose first through the center knockout from the interior of the box to project from the back of the box as seen in FIG. 15. Again, the legs of the clip are compressed and the toe tabs are positioned in the small holes on opposite sides of the center knockout. When the clip is seated in the box and projecting from the rear of the box as seen in FIG. 15, the box and clip are assembled with the strut by moving the assembly in the direction of the arrow 115 to place the nose of the clip through the slot in the channel of the strut. Finally, the box and clip are rotated 90° to the position seen in FIG. 6 thus securing the box to the strut in the selected position. The box and clip are rotated 90° in the clockwise direction as seen from the bottom indicated by the arrow 116 until the toe tabs snap into the slot.

Referring now to FIG. 17, it will be seen that the clip in its installed condition projects above the channel of the strut and the holes 41 make a convenient attachment point for a drop wire or chain as indicated at 118.

In FIG. 18, the strut 50 is shown spanning two parallel Tee bars 120 and 121. In each instance, the stem of the Tee has a bulb or enlarged head as seen at 122. FIG. 18 also illustrates how the center fingers 64 and 65 extend over the top of the stem of the Tee and bite into the web of the Tee beneath the enlarged head. If desired, a self tapping screw 124 may be driven through the hole 74 in the outer tabs of the strut using the screw driver 125. In this manner, even without the box, the strut forms a gauge span or bar for the parallel Tee-bars. The system may thus provide independent support of the box or strut with a wire or chain.

The strut is preferably stamped and formed from light gauge cold rolled pregalvanized steel, and the multiple slots span substantially all of the interior length the strut. The locking clip 20 is stamped and formed from light gauge spheroidized annealed spring steel and is heat treated, tempered and coated.

The one piece design of the strut and its Tee engaging legs or fingers coupled with the ability quickly and easily to twist and lock the box to the strut without the use of fasteners, makes the system of the present invention much easier to install, and when installed, a more secure system is provided.

Although the invention has been shown and described with respect to certain preferred embodiments, it is obvious that equivalent alterations and modifications will occur to others skilled in the art upon the reading and understanding of this specification. The present invention includes all such equivalent alterations and modifications, and is limited only by the scope of the claims.

What is claimed is:

1. A box supporting strut adapted to span between two structural members, said strut comprising a linear longitudinally slotted body, at least two longitudinally spaced aligned box supporting slot openings in said body, said box supporting slot openings being separated by a transverse bridge and said slot openings and bridge being asymmetrically located longitudinally of said body whereby a box may be supported from a slot opening anywhere between the structural members, a portion of a slot opening being available for any position of the box in one or an end-for-end position of the strut.

2. A strut as set forth in claim 1 including at least three aligned slot openings in said body.

3. A strut as set forth in claim 2 wherein said slot openings are asymmetrically located both with respect to the ends of the body and with respect to each other.

4. A strut as set forth in claim 3 wherein said body is channel shape, said slot openings being in the back of the channel and centered transversely to provide two shelves one on each side of the slot.

5. A box supporting strut adapted to span between two structural members, said strut comprising a linear longitudinally slotted body, at least three longitudinally spaced aligned box supporting slots in said body, said box supporting slots being asymmetrically located longitudinally of said body both with respect to the ends of the body and each other whereby a box may be supported from a slot anywhere between the structural members, a portion of a slot being available for any position of the box in one or an end-for-end position of the strut, said body being channel shape and said slots being in the back of the channel and centered transversely to provide two shelves, one on each side of the slot, and integrally formed clasping fingers at each end of the body adapted to grip the two structural members.

6. A strut as set forth in claim 5 including a center finger at each end of the body adapted to engage the far side of the structural member, and two outside fingers at each end of the body adapted to engage the near side of structural member.

7. A strut as set forth in claim 6 wherein the outside fingers at each end are joined and each includes a shoulder adapted to seat on the structural member.

8. A strut as set forth in claim 7 wherein each center finger includes barbs adapted to bite into the structural member.

9. A strut as set forth in claim 8 wherein said channel shape body has legs and the legs of the channel shape body extend in one direction and the fingers at the ends thereof extend in the opposite direction.

10. A one piece strut for spanning between two structural members, said strut comprising a slotted channel form elongated body having legs with structural member clasping fingers at each end of said body, the legs of the channel extending in one direction while the clasping fingers extend in the opposite direction, and at least two aligned and spaced box supporting slots in said body, said slots being asymmetrically located longitudinally of said body.

11. A strut as set forth in claim 10 wherein the legs of the channel shape body at each end gradually unfold so that the body where the clasping fingers are formed is flat.

12. A strut as set forth in claim 11 wherein said clasping fingers each include projecting portions adapted to snap over the stem of a Tee.

13. A strut as set forth in claim 10 including at least three aligned slots in said body.

14. A strut as set forth in claim 13 wherein said slots are asymmetrically located both with respect to the ends of the body and with respect to each other.

15. A strut as set forth in claim 14 wherein said body is channel shape, said slots being in the back of the channel and centered transversely to provide two substantially equal shelves, one on each side of the slot.

16. A one piece strut for spanning between two structural members, said strut comprising a slotted channel form elongated body having legs with structural member clasping fingers at each end of said body, the legs of the channel extending in one direction while the clasping fingers extend in the opposite direction, and a center finger at each end of the body adapted to engage the far side of the structural member, and two outside fingers at each end of the body adapted to engage the near side of the structural member.

17. A strut as set forth in claim 16 wherein the outside fingers at each end are joined and each includes a shoulder adapted to seat on the structural member.

18. A strut as set forth in claim 17 wherein each center finger includes barbs adapted to bite into the structural member.

19. In combination, an electrical box including a back wall, and a spring clip extending rearwardly from the back wall, and means securing said clip to the back wall so that the box becomes a handle for the clip enabling the box and clip to be manipulated as a unit to secure the box to a structure without additional fasteners, said clip including spaced tabs interfitting with the box back wall to provide a significant moment arm torque connection between the box and clip.

20. A clip for securing an object to a slotted structure comprising an inverted V-shape body having two legs each terminating in outwardly projecting feet having upturned toe tabs.

21. A clip as set forth in claim 20 wherein each leg includes a shouldered neck which has an inscribed width when the legs are pressed together small enough to rotate within a slot.

22. A clip as set forth in claim 21 including oppositely angled talons on opposite shoulders at each neck to permit the clip to be rotated when inserted into a slot in one direction only.

23. A clip as set forth in claim 22 including a external dimple on one leg to engage one edge of a slot when the legs are inserted into a slot and released.

24. A clip as set forth in claim 23 including a hole through each leg near the notch of the V to accommodate a drop wire or chain.

25. A clip for securing an object to a structure having an elongated slot comprising a V-shape body with spring legs with the apex of the V being adapted to be inserted axially through a slot when the legs are pressed together, each leg including a reduced width neck having an inscribed diameter when the legs are pressed together to enable the clip to be rotated about its axis when the neck is in the elongated slot of the structure.

26. A clip as set forth in claim 25 including feet extending outwardly of each leg, and locking toe tabs on the feet adapted to snap into the slot of the structure upon axial rotation of the clip.

27. A clip as set forth in claim 26 wherein said locking toe tabs terminate in short flanges extending parallel to but offset from the feet.

28. A clip as set forth in claim 27 including a hump at the proximal end of each short flange adapted to snap into the slot of the structure upon axial rotation of the clip.

29. A clip as set forth in claim 27 including in combination a box wall, said locking toe tabs extending through holes in the wall, and said short flanges overlapping one side of the wall while the feet overlap the other.

30. A clip as set forth in claim 25 including shoulders adjacent each neck adapted to engage behind the slot upon axial rotation of the clip.

31. A clip as set forth in claim 30 including oppositely angled talons on opposite shoulders at each neck to permit the clip to be rotated when inserted into a slot in one direction only.

32. A clip as set forth in claim 30 including angled spring tabs projecting from the shoulder operative forcibly to press the slotted structure and object together upon axial rotation of the clip.

33. An clip as set forth in claim 32 including feet extending outwardly of each leg, and locking toe tabs on the feet adapted to snap into the slot of the structure upon axial rotation of the clip.

34. A clip as set forth in claim 32 wherein said angled spring tabs have tips spaced from said feet slightly less than the thickness of the object and the thickness of the slotted structure.

35. A clip as set forth in claim 34 wherein said toe tabs project more than the thickness of the object to snap into the slot of the structure upon axial rotation of the clip.

36. A clip as set forth in claim 25 including in combination a slotted strut as the structure, said strut having a longitudinally slotted body, and integrally formed structural member clasping fingers at each end of the strut body.

37. A combination as set forth in claim 36 wherein the slotted body is channel shape, the legs of the channel extending in one direction while the clasping fingers extend in the opposite direction.

38. A combination as set forth in claim 36 including a center finger at each end of the strut body adapted to engage the far side of the structural member, and two outside fingers at each end of the strut body adapted to engage the near side of structural member.

39. A combination as set forth in claim 38 wherein the outside fingers at each end are joined and each includes a shoulder adapted to seat on the structural member.

40. A combination as set forth in claim 39 wherein each center finger includes barbs adapted to bite into the structural member.

41. A combination as set forth in claim 36 including at least two aligned slots in said strut body, said slots being asymmetrically located longitudinally of said strut body.

42. A combination as set forth in claim 41 including at least three aligned slots in said strut body.

43. A combination as set forth in claim 42 wherein said slots are asymmetrically located both with respect to the ends of the strut body and with respect to each other.

44. A combination as set forth in claim 43 wherein said strut body is channel shape, said slots being in the back of the channel and centered transversely to provide two shelves, one on each side of the slot.

45. In combination, a slotted strut, a clip including a neck, and an electrical box, said clip fitting within said box to project axially from the rear thereof, said clip and box when assembled including interfitting means to preclude relative axial rotation between the clip and box, whereby the box may be assembled to the strut by inserting the clip through the slot generally to align the neck and slot, and then rotating the box about the axis of the clip to cause the neck to rotate in the slot securing the box to the strut.

46. The combination set forth in claim 45 wherein the clip includes angled spring talons allowing the box to rotate in one direction.

47. The combination set forth in claim 45 wherein the clip includes spring tabs to press the box and strut together.

48. The combination set forth in claim 45 wherein said clip includes locking tabs projecting through the rear wall of the box whereby the box may be used as a handle to rotate the clip.

49. The combination set forth in claim 48 wherein said locking tabs project from the rear wall of the box and snap into the slot of the strut to prevent further relative rotation.

50. The combination set forth in claim 45 wherein said clip is V-shape having two legs terminating in outwardly extending feet, and locking toe tabs projecting from the ends of the feet through the rear wall of the box.

51. The combination set forth in claim 50 wherein each leg includes a shouldered neck which has an inscribed width when the legs are pressed together small enough to rotate within the slot.

52. The combination set forth in claim 51 including oppositely angled talons on opposite shoulders at each neck to permit the clip to be rotated when inserted into the slot in one direction only.

53. In combination, a strut for supporting an electrical box comprising a linear longitudinally slotted body, and a twist snap clip adapted to be inserted through the back of a box and said slot and then twisted to locking position to secure the box to the strut.

54. The combination set forth in claim 53 wherein said clip comprises hinged spring legs which may be inserted into the slot of the strut body by pressing the legs together.

55. The combination set forth in claim 54 wherein said clip comprises a V-shape body with the spring hinged legs being joined at the apex of the V.

56. The combination set forth in claim 55 wherein the apex of the V is adapted to be inserted through the slot when the legs are squeezed together.

57. The combination set forth in claim 56 wherein each leg includes a neck having an inscribed diameter when the legs are pressed together to enable the clip and box to be rotated about the clip axis when the neck is in the slot of the strut.

58. The combination set forth in claim 57 including feet extending outwardly of each leg, and locking toe tabs on the feet adapted to snap into the slot of the structure upon axial rotation of the clip.

59. The combination set forth in claim 58 including short flanges on said toe tabs parallel to but offset from the respective foot.

60. The combination set forth in claim 58 including shoulders adjacent each neck adapted to engage the structure behind the slot upon axial rotation of the clip.

61. The combination set forth in claim 60 including oppositely angled talons on opposite shoulders at each neck to permit the clip to be rotated when inserted into a slot in one direction only.

62. The combination set forth in claim 60 including angled spring tabs projecting from the shoulder operative to engage and press the slotted structure and object together upon axial rotation of the clip.

63. The combination set forth in claim 62 wherein said tabs are talons permitting rotation in one direction only, the tips of said tabs being spaced from the feet slightly less than the thickness of the box and strut slot.

64. In combination, an electrical box including a back wall, a spring clip extending rearwardly from the back wall, and a structure, and means securing said clip to the back wall so that the box becomes a handle for the clip enabling the box and clip to be manipulated as a unit with respect to said structure to secure the box to said structure without additional fasteners.

65. A box hanger assembly comprising:

a strut, a slot in said strut, a box, and a spring fastener secured to the back of the box and held to the box against rotation whereby the box becomes a handle for the fastener, said fastener including a neck slightly spaced from the box, whereby the fastener with the box secured thereto and acting as a handle may be inserted through the slot to align the neck and slot, and rotated 90° to snap-lock said box to said strut.

66. An assembly as set forth in claim 65 including spring tabs at the neck to engage behind the strut as the box and fastener are rotated pressing the box and strut together.

67. An assembly as set forth in claim 66 including lock toe tabs on said spring fastener projecting through the back of the box and adapted to snap into the slot when the box and fastener are rotated.

68. An assembly as set forth in claim 66 wherein said spring tabs are talons adapted to bite into the strut behind the slot, and said talons are angled to permit rotation of the box and fastener in one direction only.

69. A method of assembling an electrical box to a slotted strut comprising the steps of assembling a spring snap fastener to an electrical box to project therefrom whereby the box may be used as a handle for the fastener, inserting the fastener through the slot of the strut, and then using the box as a handle, twisting the box and fastener to lock the box to the strut.

70. A method as set forth in claim 69 including the step of providing the fastener with a neck having an inscribed diameter smaller than the slot to enable rotation when the neck and slot are aligned.

71. A method as set forth in claim 70 including the step of compressing the fastener to assemble it to the box and to reduce the inscribed diameter at the neck.

72. A method as set forth in claim 71 including the step of spring pressing the strut and box together as the fastener and box are twisted.

73. A method as set forth in claim 69 including the step of limiting the twisting of the box and fastener to one direction only.

74. A method as set forth in claim 69 including the step of providing holding tabs on the fastener projecting through the back of the box and adapted to snap into the slot of the structure when the box and fastener are twisted.

\* \* \* \* \*